Figure 1:
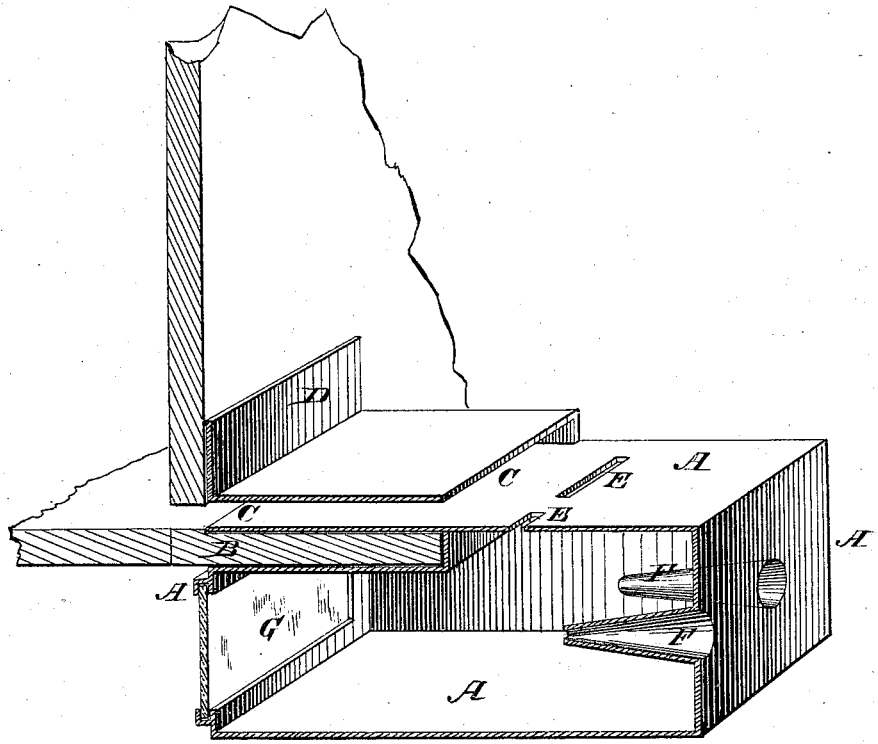

W. HOLLIS.
Moth-Trap.

No. 163,071. Patented May 11, 1875.

WITNESSES:
Francis McArdle,
A. F. Terry

INVENTOR:
W. Hollis
BY Munn & Co.
ATTORNEYS.

THE GRAPHIC CO.PHOTO-LITH.39 & 41 PARK PLACE,N.Y.

UNITED STATES PATENT OFFICE.

WASHINGTON HOLLIS, OF PEMBROKE, KENTUCKY.

IMPROVEMENT IN MOTH-TRAPS.

Specification forming part of Letters Patent No. 163,071, dated May 11, 1875; application filed April 17, 1875.

*To all whom it may concern:*

Be it known that I, WASHINGTON HOLLIS, of Pembroke, in the county of Christian and State of Kentucky, have invented a new and useful Improvement in Moth-Trap, of which the following is a specification:

The figure is a perspective view of my improved moth-trap, partly in section to show the construction.

The object of this invention is to furnish an improved trap for catching the moth-millers as they seek to enter a bee-hive, and thus prevent the ravages caused by the moths, and which shall be simple in construction, easily applied to the hive, and effective in use.

The invention consists in an improved moth-trap formed of the box, provided with the slot, the bee-passage, the flange, one or more slits, one or more tapering tubes, and the glass plate, as hereinafter fully described.

A is a rectangular tin box, in the upper part of the inner end of which is formed a slot, B, to receive the alighting-board of a bee-hive, so that the trap can be readily attached to the hive. Upon the upper side of the inner end of the box A is formed a shallow passage, C, of the same width as the box A, of about half the length of said box, and deep enough for the passage of the bees, and the inner end of which comes directly over the entrance to the hive. At the inner end of the passage C is formed an upwardly-projecting flange, D, to overlap the front of the hive. The inner end of the trap fits so snugly upon the hive that nothing can enter the said hive except through the passage C. In the top of the box A, just in front of the entrance of the passage C, are formed one, two, or more slits, E, of such a size that the moth-millers can crawl through them. In the outer end or in the side or sides of the box A are formed holes, in which are secured tubes F, projecting into the said box, and made tapering, the inner ends being made so small that the moth-millers can only crawl through them. In the side or end of the box A, farthest from the slits E and tubes F, is formed a large opening, in which is inserted a glass plate, G, so that light can shine through. In the bottom of the box A is designed to be placed a small quantity of honey to attract the moth-millers, and induce them to seek to enter the trap. When once in the trap the moth-millers will be attracted by the light through the glass plate G, and will be unable to find their way out.

The trap is designed to be japanned or heavily painted to prevent it from rusting.

Having thus described my invention, I claim as new and desire to secure by Letters Patent—

An improved moth-trap formed of the box A, provided with the slot B, the passage C, the flange D, the slits E, (one or more,) the tapering tubes F, (one or more,) and the glass plate G, substantially as herein shown and described.

WASHINGTON HOLLIS.

Witnesses:
R. S. HARRIS,
THOS. SMITH.